(12) United States Patent
Huang et al.

(10) Patent No.: US 10,872,543 B2
(45) Date of Patent: Dec. 22, 2020

(54) DISPLAY DEVICE

(71) Applicant: Primax Electronics Ltd., Taipei (TW)

(72) Inventors: Wei-Chiang Huang, Taipei (TW); Wei-Ping Chan, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 16/424,163

(22) Filed: May 28, 2019

(65) Prior Publication Data

US 2020/0126460 A1  Apr. 23, 2020

Related U.S. Application Data

(60) Provisional application No. 62/747,885, filed on Oct. 19, 2018.

(51) Int. Cl.
| | |
|---|---|
| *H05K 5/00* | (2006.01) |
| *G09F 9/33* | (2006.01) |
| *F21V 8/00* | (2006.01) |
| *H05K 5/02* | (2006.01) |

(52) U.S. Cl.
CPC ............ *G09F 9/33* (2013.01); *G02B 6/0055* (2013.01); *G02B 6/0073* (2013.01); *H05K 5/02* (2013.01)

(58) Field of Classification Search
None
See application file for complete search history.

(56) References Cited

U.S. PATENT DOCUMENTS

| | | | | |
|---|---|---|---|---|
| 6,191,833 | B1* | 2/2001 | Hirakata | G02B 6/0053 349/137 |
| 6,644,824 | B2* | 11/2003 | Baba | G02B 6/0028 362/330 |
| 8,864,356 | B2* | 10/2014 | Lin | F21V 7/00 362/606 |
| 9,575,236 | B2* | 2/2017 | Ichikawa | G02B 6/0088 |
| 10,001,672 | B2* | 6/2018 | Watanabe | F21S 2/005 |
| 10,203,436 | B2* | 2/2019 | Whitehead | G02B 26/02 |
| 2003/0137617 | A1* | 7/2003 | Cornelissen | G02B 6/0056 349/63 |
| 2004/0141108 | A1* | 7/2004 | Tanaka | G02B 6/0038 349/96 |
| 2006/0279672 | A1* | 12/2006 | Kim | G02F 1/13362 349/65 |
| 2007/0008739 | A1* | 1/2007 | Kim | G02B 6/0021 362/612 |

(Continued)

*Primary Examiner* — Courtney L Smith
*Assistant Examiner* — Rashen E Morrison
(74) *Attorney, Agent, or Firm* — Kirton McConkie; Evan R. Witt

(57) ABSTRACT

A display device includes a display plate, a micro light source, a first reflecting element and a second reflecting element. The display plate has a pattern. The micro light source emits a light beam. The first reflecting element is arranged beside a first side of the display plate. A first portion of the light beam is reflected by the first reflecting element. A second portion of the light beam is transmitted through the first reflecting element. The second reflecting element is arranged beside a second side of the display plate to reflect the light beam. The light beam is repeatedly reflected by the first reflecting element and the second reflecting element, so that a multiple-luminous effect of the pattern is provided.

11 Claims, 6 Drawing Sheets
(1 of 6 Drawing Sheet(s) Filed in Color)

(56) References Cited

U.S. PATENT DOCUMENTS

| | | | |
|---|---|---|---|
| 2008/0055516 A1* | 3/2008 | Seo | G02B 6/0031 349/65 |
| 2013/0063971 A1* | 3/2013 | Lin | G02B 6/0068 362/606 |
| 2013/0141668 A1* | 6/2013 | Washio | G02F 1/133555 349/62 |
| 2013/0147757 A1* | 6/2013 | Chen | G06F 3/0238 345/174 |
| 2016/0138790 A1* | 5/2016 | Peterson | G02B 6/0073 362/23.12 |

\* cited by examiner

DISPLAY DEVICE

CROSS-REFERENCE TO RELATED APPLICATION

This application claims the benefit of U.S. Provisional Patent Application No. 62/747,885 filed Oct. 19, 2018, the contents of which are incorporated herein by reference.

FIELD OF THE INVENTION

The present invention relates to a display device, and more particularly to a display device with a specified pattern.

BACKGROUND OF THE INVENTION

Generally, the casings of various products are equipped with brand patterns in order to provide brand recognition. In the field of an electronic device, an electronic circuit is disposed within the electronic device. In case that the brand pattern on the casing of the electronic device is electrically connected with the electronic circuit, the brand pattern is illuminated to provide a more conspicuous visual effect.

Moreover, for illuminating the brand pattern, a display device is installed within the electronic device. FIG. 1 is a schematic front view illustrating a conventional display device. The conventional display device 1 comprises a display plate 11, plural light emitting diodes 12 and a driving circuit module (not shown). The display plate 11 is disposed within a casing (not shown) of the electronic device (not shown). The display plate 11 has a pattern 111. For example, the pattern 111 is a brand pattern to be displayed. The casing 111 is made of a translucent material.

Consequently, the display plate 11 is visible through the casing. The plural light emitting diodes 12 are circumferentially arranged around the display plate 11. When the light emitting diodes 12 are enabled, the light emitting diodes 12 emit plural light beams B. The plural light beams B are projected into the display plate 11. The driving circuit module is electrically connected with the light emitting diodes 12 and the internal circuit of the electronic device. The driving circuit module acquires electric power from the electronic device in order to drive the light emitting diodes 12.

When the plural light emitting diodes 12 are driven to emit the plural light beams B, the light beams B are projected to the display plate 11. Consequently, the pattern 111 is illuminated, and a luminous effect is provided. In such way, the user can view the pattern 111 through the transparent casing. However, since the light emitting diode 12 has the bulky volume, the conventional display device 1 is only suitably applied to the large-sized electronic device. Moreover, the ordinary luminous pattern cannot meet the user's requirements.

For meeting the user's requirements, there is a need of providing a display device that is capable of generating special displaying effects.

SUMMARY OF THE INVENTION

An object of the present invention provides a display device for a small-sized electronic device.

Another object of the present invention provides a display device capable of generating special displaying effects.

In accordance with an aspect of the present invention, a display device is provided. The display device includes a casing, a display plate, at least one micro light source, a first reflecting element and a second reflecting element. The display plate is disposed within the casing, and has a pattern. The at least one micro light source is disposed within the casing, and arranged near the display plate. The at least one micro light source emits at least one light beam. The first reflecting element is disposed within the casing, and arranged beside a first side of the display plate. A first portion of the at least one light beam is reflected by the first reflecting element. A second portion of the at least one light beam is transmitted through the first reflecting element. The second reflecting element is disposed within the casing, and arranged beside a second side of the display plate to reflect the at least one light beam. The at least one light beam is repeatedly reflected by the first reflecting element and the second reflecting element, so that a multiple-luminous effect of the pattern is provided.

In accordance with another aspect of the present invention, a display device is provided. The display device includes a casing, a display plate, at least one micro light source, a light guide plate, a first reflecting element and a second reflecting element. The display plate is disposed within the casing, and has a pattern. The at least one micro light source is disposed within the casing. The at least one micro light source emits at least one light beam. The light guide plate is arranged between the display plate and the at least one micro light source. After the at least one light beam is received by the light guide plate, the at least one light beam is guided to the display plate by the light guide plate. The first reflecting element is disposed within the casing, and arranged beside a first side of the display plate. A first portion of the at least one light beam is reflected by the first reflecting element. A second portion of the at least one light beam is transmitted through the first reflecting element. The second reflecting element is disposed within the casing, and arranged beside a second side of the display plate to reflect the at least one light beam. The at least one light beam is repeatedly reflected by the first reflecting element and the second reflecting element, so that a multiple-luminous effect of the pattern is provided.

From the above descriptions, the display device of the present invention is equipped with the first reflecting element and the second reflecting element. The cooperation of the first reflecting element, the second reflecting element and the display plate allows the pattern to exhibit the special multiple-luminous effect in order to meet the user's requirement. In some embodiments, the display device is equipped with the light guide plate or the light guide elements to guide the light beams. Since the installation positions of the plural micro light sources are not viewed by the naked eyes, the problem of showing the light sources is solved.

The above objects and advantages of the present invention will become more readily apparent to those ordinarily skilled in the art after reviewing the following detailed description and accompanying drawings, in which:

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE PREFERRED EMBODIMENT

For overcoming the drawbacks of the conventional technologies, the present invention provides a display device.

Figure 1:
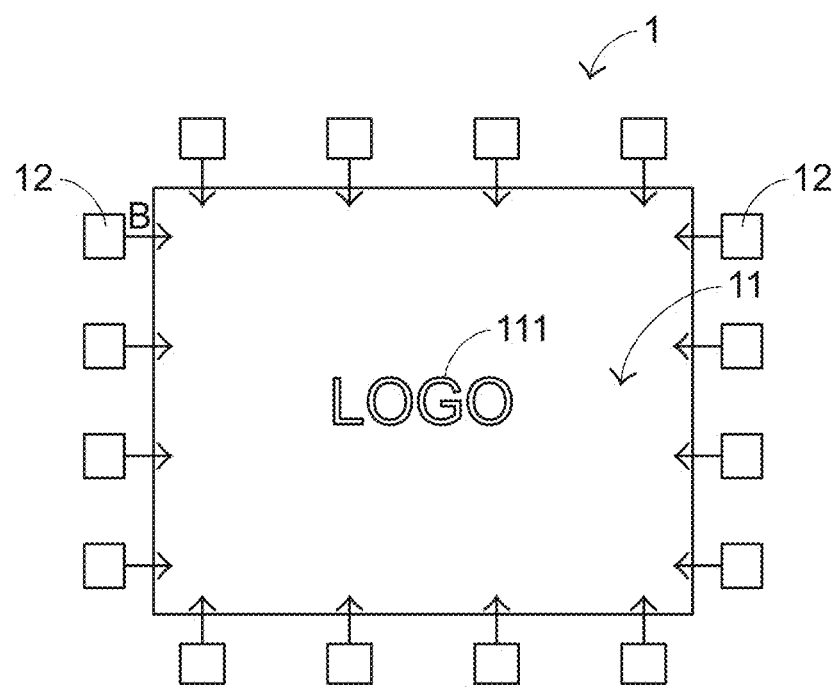
FIG. 1 is a schematic front view illustrating a conventional display device.
Figure 2:
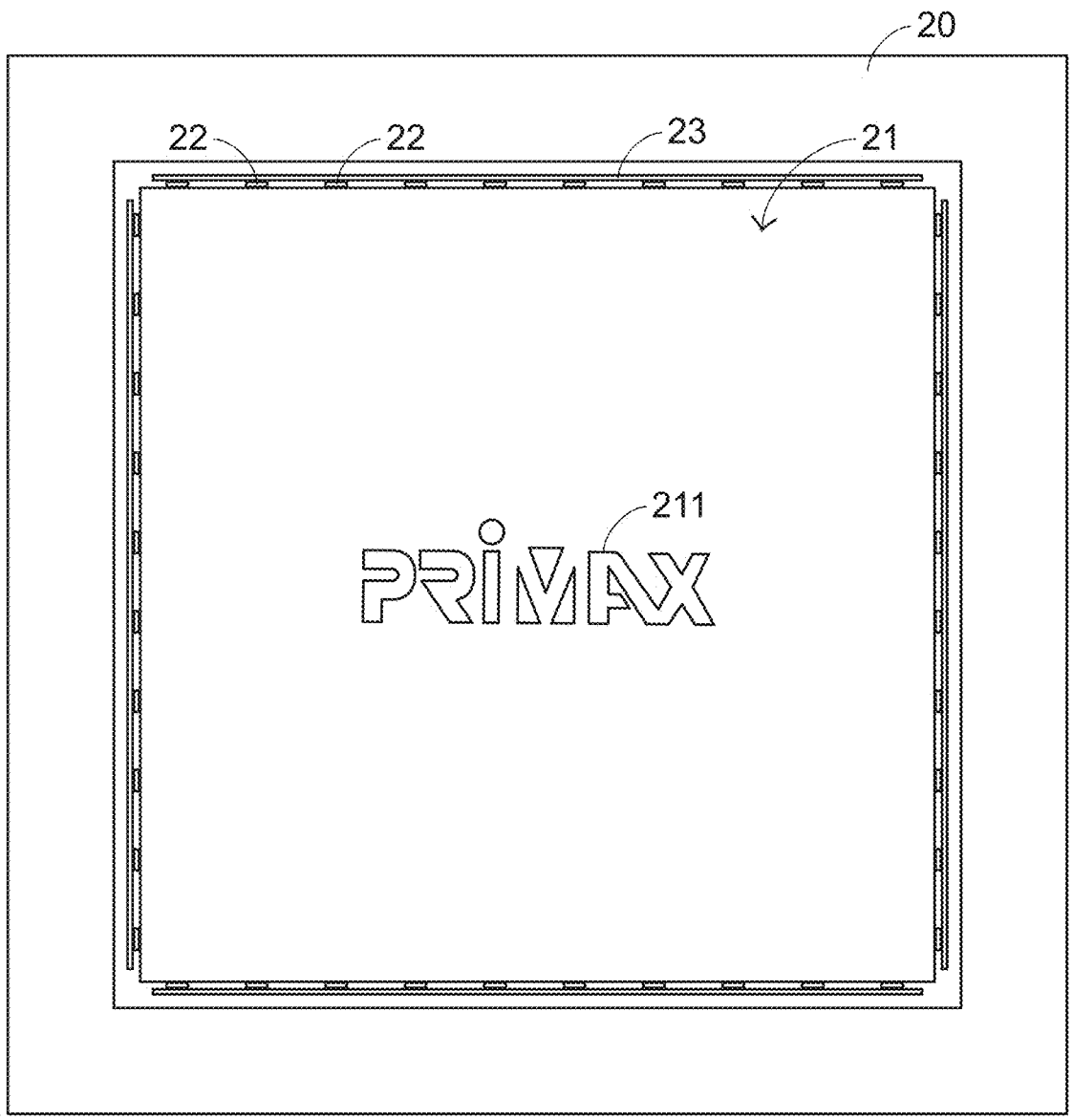
FIG. 2 is a schematic front view illustrating the structure of a display device according to a first embodiment of the present invention.
Figure 3:
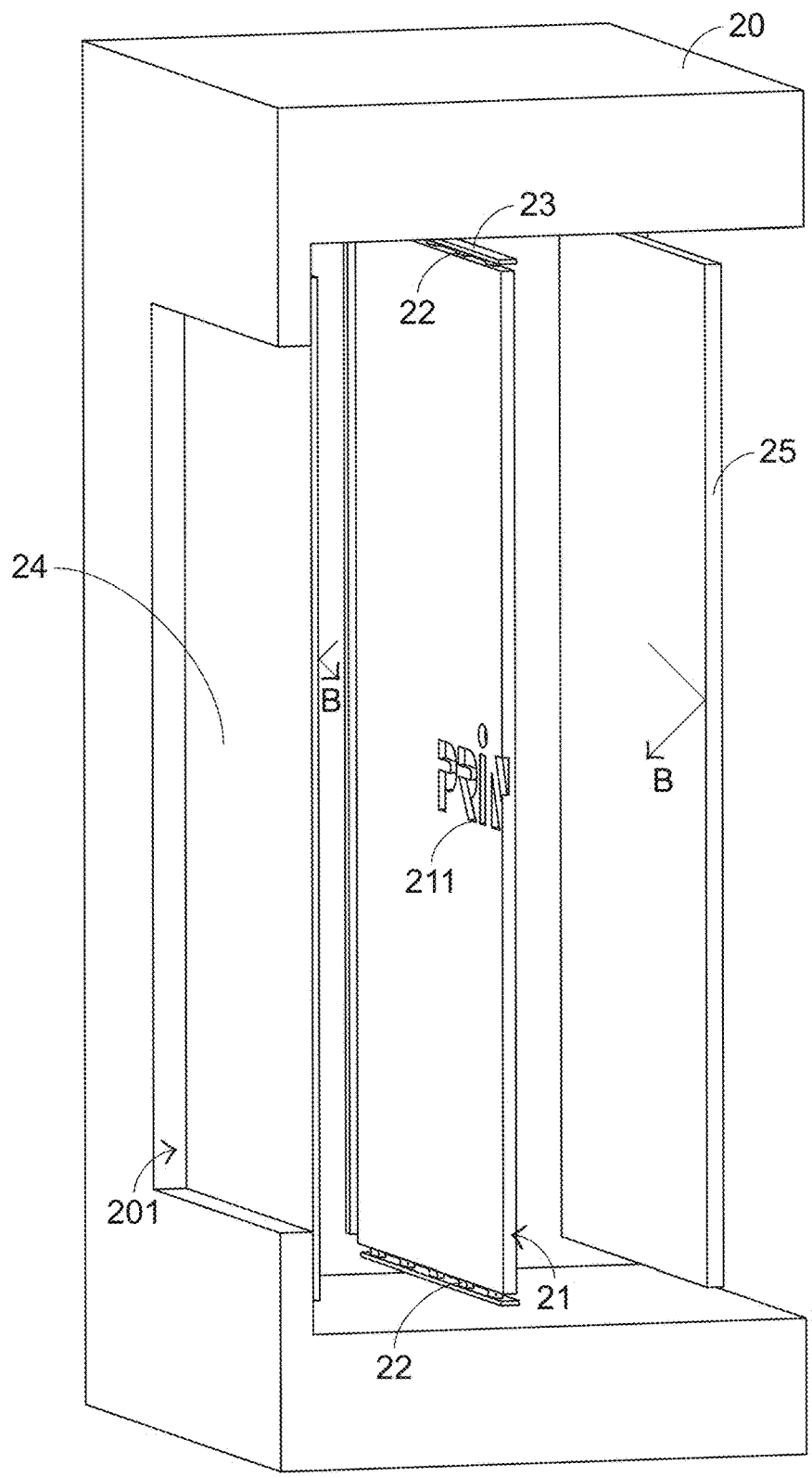
FIG. 3 is a schematic cutaway view illustrating the structure of the display device according to the first embodiment of the present invention.

Please refer to FIG. 2 and FIG. 3. FIG. 2 is a schematic front view illustrating the structure of a display device according to a first embodiment of the present invention. FIG. 3 is a schematic cutaway view illustrating the structure of the display device according to the first embodiment of the present invention. In this embodiment, the display device 2 comprises a casing 20, a display plate 21, plural micro light sources 22, a driving circuit module 23, a first reflecting element 24 and a second reflecting element 25. The display plate 21 is disposed within the casing 20. The display plate 21 has a pattern 211. In an embodiment, the pattern 211 is formed on the display plate 21 by a printing process. In another embodiment, plural light-guiding microstructures are formed on the display plate 21 to form the pattern 211. The plural micro light sources 22 are disposed within the casing 20 and circumferentially arranged around the display plate 21. When the micro light sources 22 are enabled, the micro light sources 22 emit plural light beams B. The plural light beams B are projected into the display plate 21. After the plural light beams B are transmitted through the display plate 21, the plural light beams B are scattered to the surroundings. Consequently, first portions of the light beams B are projected to the first reflecting element 24, and second portions of the light beams B are projected to the second reflecting element 25.

In an embodiment, the display plate 21 is made of polymethylmethacrylate (PMMA) or polycarbonate (PC). The micro light sources 22 are micro light emitting diodes (Micro LED). The volume of the micro light emitting diode 22 is smaller than the volume of the conventional light emitting diode 12. Consequently, the plural micro light sources 22 can be arranged more densely.

The driving circuit module 23 is electrically connected with the plural micro light sources 22 and the internal circuit of the electronic device. The driving circuit module 23 acquires electric power from the electronic device in order to drive the plural micro light sources 22. The driving circuit module 23 at least comprises a flexible circuit board. The flexible circuit board is used for supporting the plural micro light sources 22 and providing electric power to the plural micro light sources 22. Due to the bendable flexibility, the flexible circuit board can be bent according to the layout of the electronic device and the display plate 21. Consequently, the driving circuit module 23 can be installed easily. The use of the flexible circuit board in the driving circuit module 23 is presented herein for purpose of illustration and description only. For example, in another embodiment, the driving circuit module comprises a printed circuit board.

Please refer to FIG. 3 again. The casing 20 comprises an opening 201. The first reflecting element 24 is disposed within the casing 20. Moreover, the first reflecting element 24 is arranged beside a first side of the display plate 21 and located near the opening 201. The first reflecting element 24 is used for reflecting the plural light beams B. Especially, the portions of the plural light beams B exited from the display plate 21 and scattered to the surroundings are reflected by the first reflecting element 24. In an embodiment, the reflectivity of the first reflecting element 24 is in the range between 40% and 50%. For example, the first reflecting element 24 is made of a translucent material. Consequently, portions of the light beams B are reflected by the first reflecting element 24, and the other portions of the light beams B are transmitted through the first reflecting element 24. It is noted that numerous modifications and alterations may be made while retaining the teachings of the invention. In another embodiment, a reflective material is coated, evaporated or sputtered on the first reflecting element. Consequently, the reflectivity of the first reflecting element can be adjusted according to the above method. After the light beams B are transmitted through the first reflecting element 24, the light beams B are outputted from the display device 2 through the opening 201.

The second reflecting element 25 is disposed within the casing 20. Moreover, the second reflecting element 25 is arranged beside a second side of the display plate 21. The second reflecting element 25 is used for reflecting the plural light beams B. Especially, the portions of the plural light beams B exited from the display plate 21 and scattered to the surroundings are reflected by the second reflecting element 25. In an embodiment, the reflectivity of the second reflecting element 25 is 100%. For example, the second reflecting element 25 is made of a mirror material. Alternatively, a reflective material is coated, evaporated or sputtered on the second reflecting element.

The operations of the display device 2 will be described as follows. Please refer to FIG. 2 and FIG. 3 again. When the plural micro light sources 22 are not driven by the driving circuit module 23, the display device 2 is not illuminated. When the plural micro light sources 22 are driven by the driving circuit module 23, the micro light sources 22 emit the plural light beams B. The plural light beams B are projected into the display plate 21. After the plural light beams B are transmitted through the pattern 211 of the display plate 21, the plural light beams B are exited from the display plate 21. After the plural light beams B are exited from the display plate 21, the first portions of the light beams B are projected to the first reflecting element 24, and the second portions of the light beams B are projected to the second reflecting element 25. The first portions of the light beams B are partially transmitted through the first reflecting element 24, and thus the luminous effect of the pattern 211 is shown. Moreover, the first portions of the light beams B are partially reflected by the first reflecting element 24, transmitted through the display plate 21, and reflected by the second reflecting element 25. Consequently, the light beams B are projected to the first reflecting element 24 again. Similarly, the light beams B are partially transmitted through the first reflecting element 24 and partially reflected by the first reflecting element 24. The above processes are repeatedly done. Consequently, a multi-luminous effect of the pattern 211 is provided by the display device 2.

After the second portions of the light beams B are projected to the second reflecting element 25, the second portions of the light beams B are reflected by the second reflecting element 25, transmitted through the display plate 21, and projected to the first reflecting element 24. As mentioned above, the light beams B are partially transmitted through the first reflecting element 24, and thus the luminous effect of the pattern 211 is shown. Moreover, the light beams B are partially reflected by the first reflecting element 24 and reflected by the second reflecting element 25 again. Consequently, as shown in FIG. 4, the multi-luminous effect of the pattern 211 is provided by the display device 2.

Figure 5:
FIG. 5 schematically illustrates the multiple color luminous effects provided by the display device according to the first embodiment of the present invention.

Due to the arrangements of the display plate 21, the first reflecting element 24 and the second reflecting element 25, the multi-luminous effect of the pattern 211 is provided by the display device 2. In a preferred embodiment, the plural micro light sources include red micro light emitting diodes, green micro light emitting diodes and blue micro light emitting diodes. Consequently, the plural micro light sources emit the red light beams, the green light beams and the blue light beams. Due to the arrangements of the display plate, the first reflecting element and the second reflecting element, a colorful and multiple-luminous effect of the pattern is provided by the display device (see FIG. 5).

Figure 4:
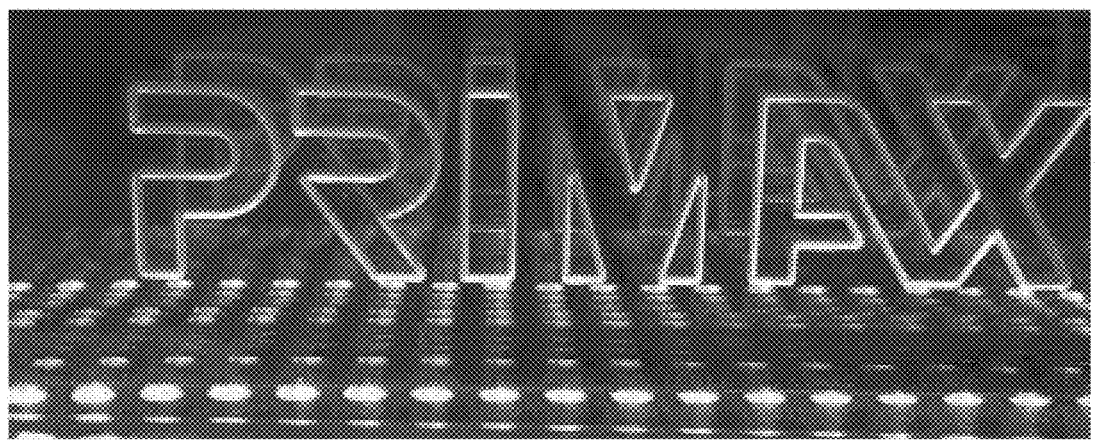
FIG. 4 schematically illustrates the multiple luminous effects provided by the display device according to the first embodiment of the present invention.

As shown in FIG. 4, the multi-luminous effect of the pattern 211 is provided by the display device 2. Moreover, the plural micro light sources 22 and the multi-luminous effect of the plural micro light sources 22 are shown. However, some users prefer that the light sources are not shown. For overcoming this problem, the present invention further provides a second embodiment.

Figure 6:
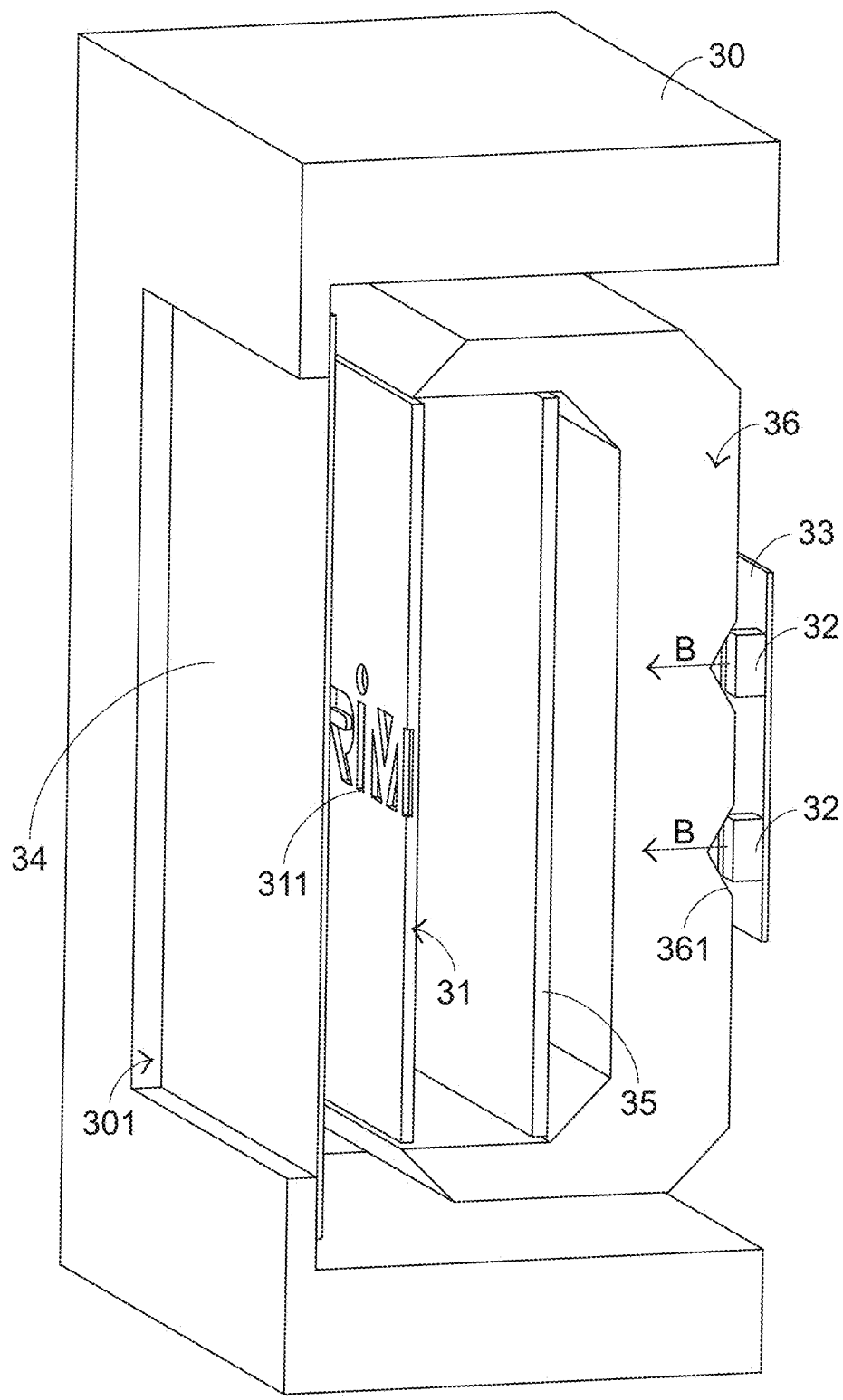
FIG. 6 is a schematic cutaway view illustrating the structure of the display device according to a second embodiment of the present invention.

FIG. 6 is a schematic cutaway view illustrating the structure of the display device according to a second embodiment of the present invention. In this embodiment, the display device 3 comprises a casing 30 with an opening 301, a display plate 31, plural micro light sources 32, a driving circuit module 33, a first reflecting element 34 and a second reflecting element 35 and a light guide plate 36. The structures and functions of the components of the display device which are identical to those of the first embodiment are not redundantly described herein. In comparison with the first embodiment, the display device of this embodiment is additionally equipped with the light guide plate 36, and the installation positions of the plural micro light sources 32 and the light guide plate 36 are distinguished.

The light guide plate 36 is arranged between the display plate 31 and the plural micro light sources 32. The light guide plate 36 is arranged beside the second reflecting element 35 and extended forwardly to the lateral edges of the display plate 31. The light guide plate 36 is used for receiving the plural light beams B and guiding the plural light beams B to the display plate 31. The light guide plate 36 comprises plural light-inputting parts 361. The plural light-inputting parts 361 are located at a side of the light guide plate 36. Each light-inputting part 361 is aligned with one corresponding micro light source 32. The plural micro light sources 32 are installed on the driving circuit module 33 and inserted into the corresponding light-inputting parts 361 of the light guide plate 36. The driving circuit module 33 is arranged beside the light guide plate 36.

When the plural micro light sources 32 are driven by the driving circuit module 33, the micro light sources 32 emit plural light beams B. The plural light beams B are projected into the light guide plate 36. In response to the structure of the light guide plate 36, the plural light beams B are introduced into the display plate 31 through the lateral edges of the display plate 31. After the plural light beams B are transmitted through the pattern 311 of the display plate 31, the plural light beams B are exited from the display plate 31. The subsequent procedures of transferring the light beams B after the light beams B are exited from the display plate 31 and the principles of providing the multi-luminous effect of the pattern 311 are similar to those of the first embodiment, and are not redundantly described herein. Since the display device is equipped with the light guide plate 36, the installation positions of the plural micro light sources 32 are not viewed by the naked eyes through the first reflecting element 34. Consequently, the problem of showing the light sources is solved. Moreover, due to the arrangement of the light guide plate 36, the number of the micro light sources 32 is reduced. Consequently, the cost of the display device is reduced.

Figure 7:
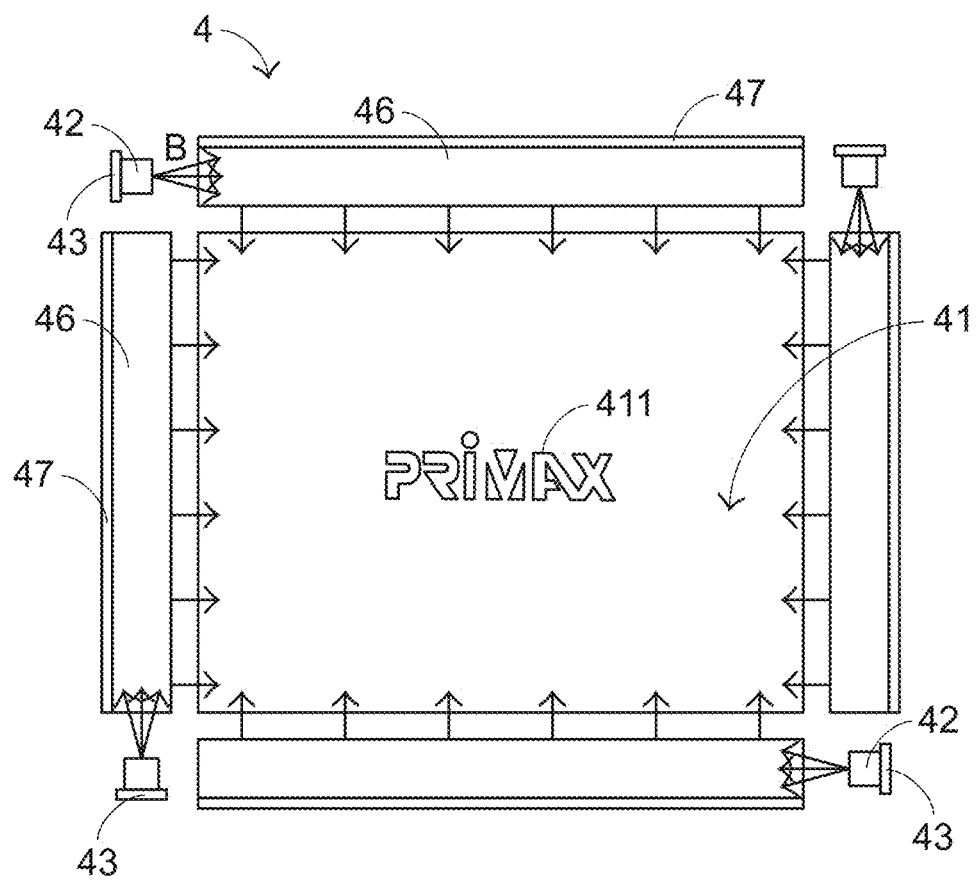
FIG. 7 is a schematic front view illustrating a portion of the structure of the display device according to a third embodiment of the present invention.

The present invention further provides a third embodiment. FIG. 7 is a schematic front view illustrating a portion of the structure of the display device according to a third embodiment of the present invention. In this embodiment, the display device 4 comprises a casing (not shown), a display plate 41, plural micro light sources 42, a driving circuit module 43, a first reflecting element (not shown), a second reflecting element (not shown), plural light guide elements 46 and plural reflective structures 47. The structures and functions of the components of the display device which are identical to those of the first embodiment are not redundantly described herein. In comparison with the first embodiment, the display device of this embodiment is additionally equipped with the plural light guide elements 46 and the plural reflective structures 47.

The plural light guide elements 46 are arranged around the display plate 41 and located near the display plate 41. The plural light guide elements 46 are used for receiving the plural light beams B and guiding the plural light beams B to the display plate 41. Each light guide element 46 is aligned with one or plural micro light sources 42. The plural micro light sources 42 are arranged beside the corresponding light guide elements 46. The plural micro light sources 42 emit the light beams B. The light beams B are guided by the light guide elements 46 and thus projected into the corresponding light guide elements 46. Each reflective structure 47 is aligned with one corresponding light guide element 46 and arranged beside the light guide element 46. Each light guide element 46 has a first surface and a second surface. The first surface is closer to the display plate 41 than the second surface. The corresponding reflective structure 47 is disposed on the second surface of the light guide element 46. In an embodiment, the light guide elements 46 are light guide plates, and the reflective structures 47 are reflecting plates. It is noted that the examples of the light guide elements and the reflective structures 47 are not restricted.

When the plural micro light sources 42 are driven by the driving circuit module 43, the micro light sources 42 emit plural light beams B. The plural light beams B are projected into the corresponding light guide elements 46. The plural light beams B are guided by the light guide elements 46, and thus the plural light beams B are introduced into the display plate 41 through the lateral edges of the display plate 41. Then, the plural light beams B are transmitted through the pattern 411 of the display plate 41. While the light beams B are transferred through the light guide element 46 and projected onto the second surface of the light guide element 46, the light beams B are reflected by the corresponding reflective structure 47. Consequently, the light beams B are introduced into the light guide element 46 again, and the light utilization efficiency is enhanced. The subsequent procedures of transferring the light beams B after the light beams B are exited from the display plate 41 and the principles of providing the multi-luminous effect of the pattern 411 are similar to those of the above embodiments, and are not redundantly described herein.

Since the display device is equipped with the plural light guide elements 46 and the plural reflective structures 47, the installation positions of the plural micro light sources 42 are not viewed by the naked eyes through the first reflecting element. Consequently, the problem of showing the light sources is solved.

From the above descriptions, the display device of the present invention is equipped with the first reflecting element and the second reflecting element. The cooperation of the first reflecting element, the second reflecting element and the display plate allows the pattern to exhibit the special multiple-luminous effect in order to meet the user's requirement. In some embodiments, the display device is equipped with the light guide plate or the light guide elements to guide the light beams. Since the installation positions of the plural micro light sources are not viewed by the naked eyes, the problem of showing the light sources is solved.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A display device, comprising:
a casing;
a display plate disposed within the casing, and having an unchangeable pattern;
at least one micro light source disposed within the casing, and arranged near the display plate, wherein the at least one micro light source emits at least one light beam;
a first reflecting element disposed within the casing, and arranged beside a first side of the display plate, wherein the first reflecting element is made of a translucent material, so that a first portion of the at least one light beam is reflected by the first reflecting element, and a second portion of the at least one light beam is transmitted through the first reflecting element; and
a second reflecting element disposed within the casing, and arranged beside a second side of the display plate to reflect the at least one light beam, wherein the reflectivity of the second reflecting element is 100% so that the at least one light beam is repeatedly reflected by the first reflecting element and the second reflecting element to provide a multiple-luminous effect of the pattern.

2. The display device according to claim 1, wherein the display device further comprises a driving circuit module, wherein the driving circuit module is electrically connected with the at least one micro light source, and the at least one micro light source is driven by the driving circuit module.

3. The display device according to claim 1, wherein the first reflecting element is made of a translucent material, or a reflective material is coated, evaporated or sputtered on the first reflecting element.

4. The display device according to claim 1, wherein the second reflecting element is made of a mirror material, or a reflective material is coated, evaporated or sputtered on the second reflecting element.

5. The display device according to claim 1, further comprising:

at least one light guide element arranged around the display plate, and located near the display plate, wherein after the at least one light beam is received by the at least one light guide element, the at least one light beam is guided to the display plate by the at least one light guide element, wherein each micro light source is aligned with and arranged beside one corresponding light guide element; and
at least one reflective structure corresponding to the at least one light guide element, wherein each reflective structure is disposed on a surface of the corresponding light guide element, and the at least one light beam is reflected by the at least one reflective structure.

6. A display device, comprising:
a casing;
a display plate disposed within the casing, and having an unchangeable pattern;
at least one micro light source disposed within the casing, wherein the at least one micro light source emits at least one light beam;
a light guide plate arranged between the display plate and the at least one micro light source, wherein after the at least one light beam is received by the light guide plate, the at least one light beam is guided to the display plate by the light guide plate;
a first reflecting element disposed within the casing, and arranged beside a first side of the display plate, wherein the first reflecting element is made of a translucent material, so that a first portion of the at least one light beam is reflected by the first reflecting element, and a second portion of the at least one light beam is transmitted through the first reflecting element; and
a second reflecting element disposed within the casing, and arranged beside a second side of the display plate to reflect the at least one light beam, wherein the reflectivity of the second reflecting element is 100% so that the at least one light beam is repeatedly reflected by the first reflecting element and the second reflecting element to provide a multiple-luminous effect of the pattern.

7. The display device according to claim 6, wherein the light guide plate is arranged beside the second reflecting element and extended to a lateral edge of the display plate, wherein the at least one light beam is guided by the light guide plate and introduced into the display plate through the lateral edge of the display plate.

8. The display device according to claim 6, wherein the light guide plate comprises at least one light-inputting part, wherein the at least one light-inputting part is located at a side of the light guide plate, and each light-inputting part is aligned with one corresponding micro light source, wherein the at least one micro light source is inserted into the corresponding light-inputting part.

9. The display device according to claim 6, wherein the first reflecting element is made of a translucent material, or a reflective material is coated, evaporated or sputtered on the first reflecting element.

10. The display device according to claim 6, wherein the second reflecting element is made of a mirror material, or a reflective material is coated, evaporated or sputtered on the second reflecting element.

11. A display device, comprising:
a casing;
a display plate disposed within the casing, and having an unchangeable pattern;

at least one micro light source disposed within the casing, and arranged near the display plate, wherein the at least one micro light source emits at least one light beam;

a first reflecting element disposed within the casing, and arranged beside a first side of the display plate, wherein the first reflecting element is made of a translucent material, so that a first portion of the at least one light beam is reflected by the first reflecting element, and a second portion of the at least one light beam is transmitted through the first reflecting element; and a second reflecting element disposed within the casing, and arranged beside a second side of the display plate to reflect the at least one light beam, wherein the reflectivity of the second reflecting element is 100% so that the at least one light beam is repeatedly reflected by the first reflecting element and the second reflecting element to provide a multiple-luminous effect of the pattern; wherein the display device further comprising:

at least one light guide element arranged around the display plate, and located near the display plate, wherein after the at least one light beam is received by the at least one light guide element, the at least one light beam is guided to the display plate by the at least one light guide element, wherein each micro light source is aligned with and arranged beside one corresponding light guide element; and at least one reflective structure corresponding to the at least one light guide element, wherein each reflective structure is disposed on a surface of the corresponding light guide element, and the at least one light beam is reflected by the at least one reflective structure.

\* \* \* \* \*